W. H. PERRY.
DRYING APPARATUS.
APPLICATION FILED DEC. 26, 1918.

1,363,431.

Patented Dec. 28, 1920.
6 SHEETS—SHEET 6.

INVENTOR.
William H Perry
BY A.B. Bowman
ATTORNEY.

UNITED STATES PATENT OFFICE.

WILLIAM H. PERRY, OF SAN DIEGO, CALIFORNIA, ASSIGNOR OF ONE-HALF TO NORMANDY SEA FOOD COMPANY, A COPARTNERSHIP, OF SAN DIEGO, CALIFORNIA.

DRYING APPARATUS.

1,363,431. Specification of Letters Patent. Patented Dec. 28, 1920.

Application filed December 26, 1918. Serial No. 268,364.

*To all whom it may concern:*

Be it known that I, WILLIAM H. PERRY, a citizen of the United States, residing at San Diego, in the county of San Diego and State of California, have invented certain new and useful Improvements in Drying Apparatus, of which the following is a specification.

My invention relates to a drying apparatus more particularly adapted for drying fish, fruit or other articles by evaporation more particularly by the use of a current of warm air for removing the natural moisture from fish, fruit, vegetables or other articles. The usual method of drying fish, fruit and so forth in a continuous drier with warm air consists in forcing a current of warm air into a single duct containing a conveyer moving toward the source of warm air which is introduced in one end and moves the entire length of the duct and therefore becomes laden with moisture before it escapes into the open. The wet articles to be dried are introduced at the end of the duct at which the damp air escapes.

The objects of my invention are first, to provide an apparatus in which a current of warm or heated air may be introduced and distributed at the proper intervals upon a moving conveyer containing the fish or other articles to be dried and to discharge the air at intervals after it has become moist by evaporation from the fish or other articles to be dried and after it has lost a large percentage of its quality of absorption, second, to provide an apparatus of this class in which there is a separate duct for passing the heated air to the proper position for introduction to the conveyer or conveyers and means for its exit after it has absorbed a large percentage of the moisture, third, to provide an apparatus of this class which is very efficient in its action and fourth, to provide an apparatus of this class which is simple and economical of construction, durable, easy to operate, easy to install and which will not readily deteriorate or get out of order.

Figure 1:
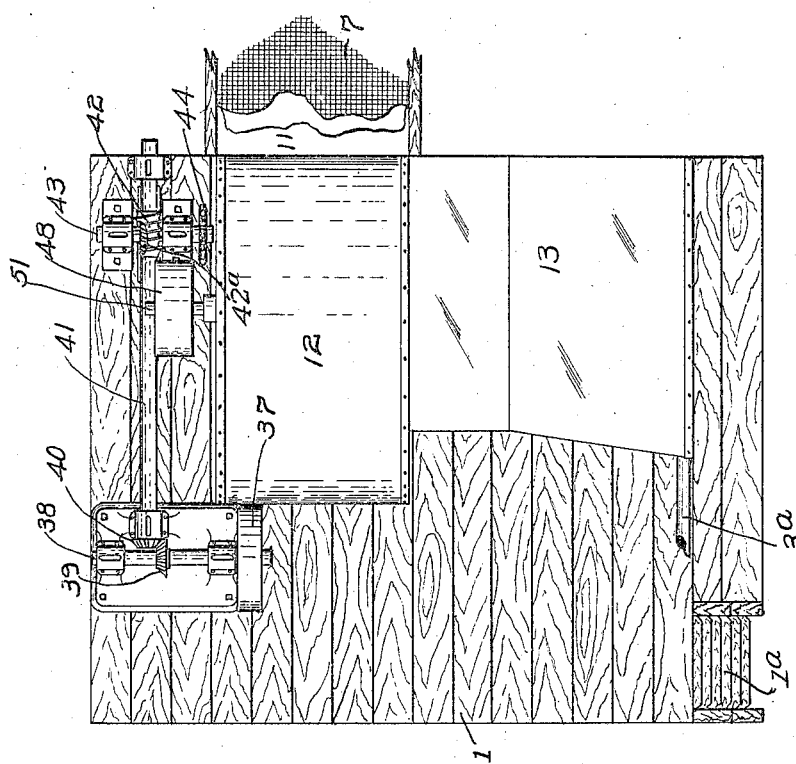
Figure 2:
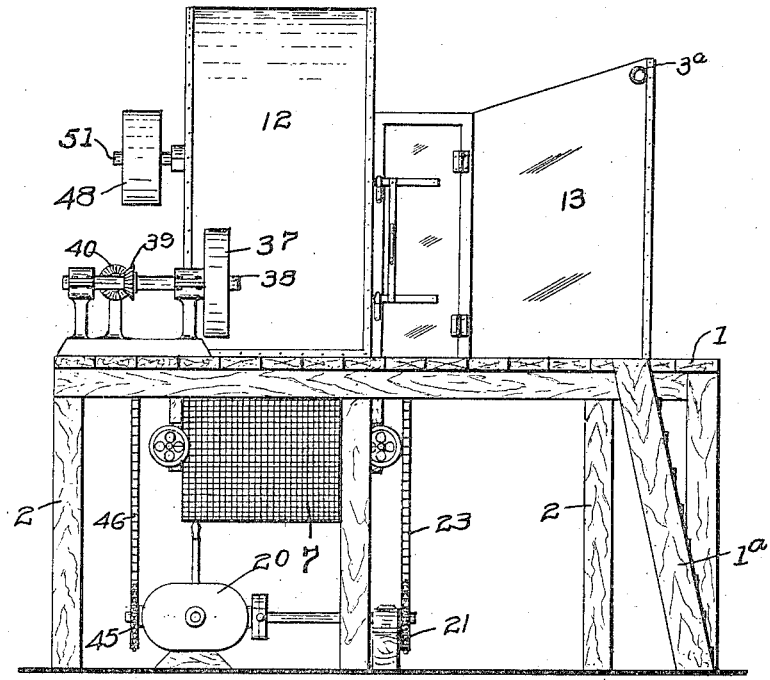
Figure 3:
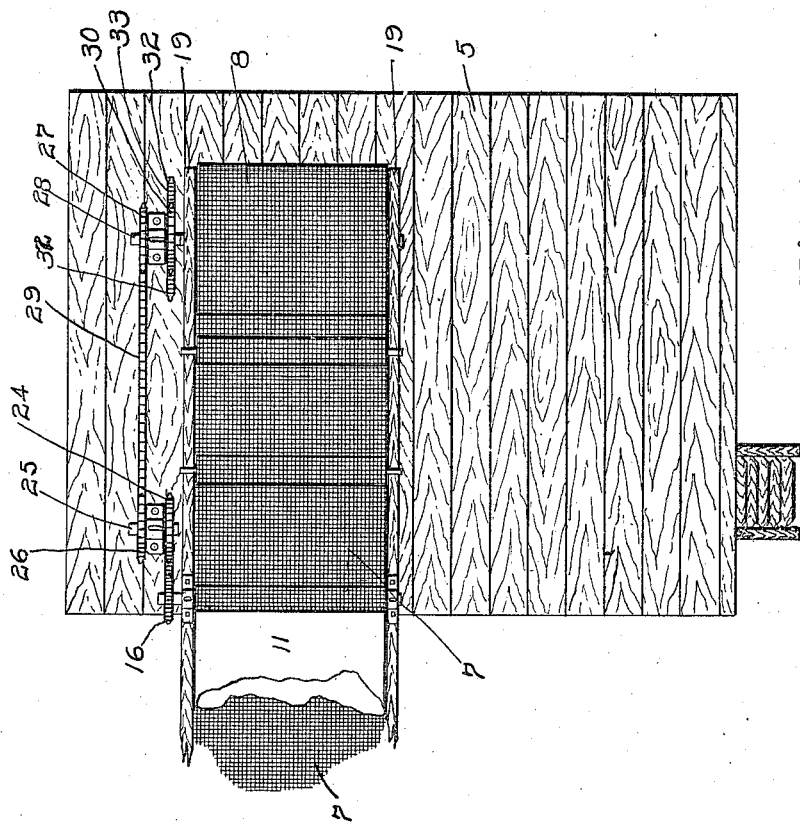
Figure 4:
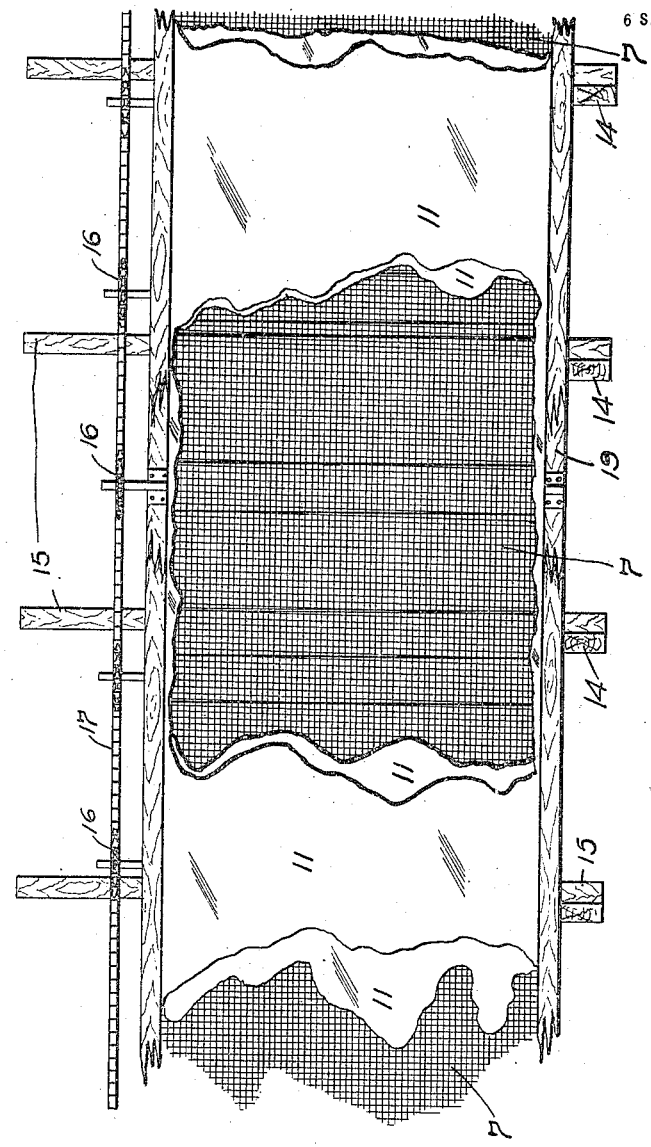
Figure 5:
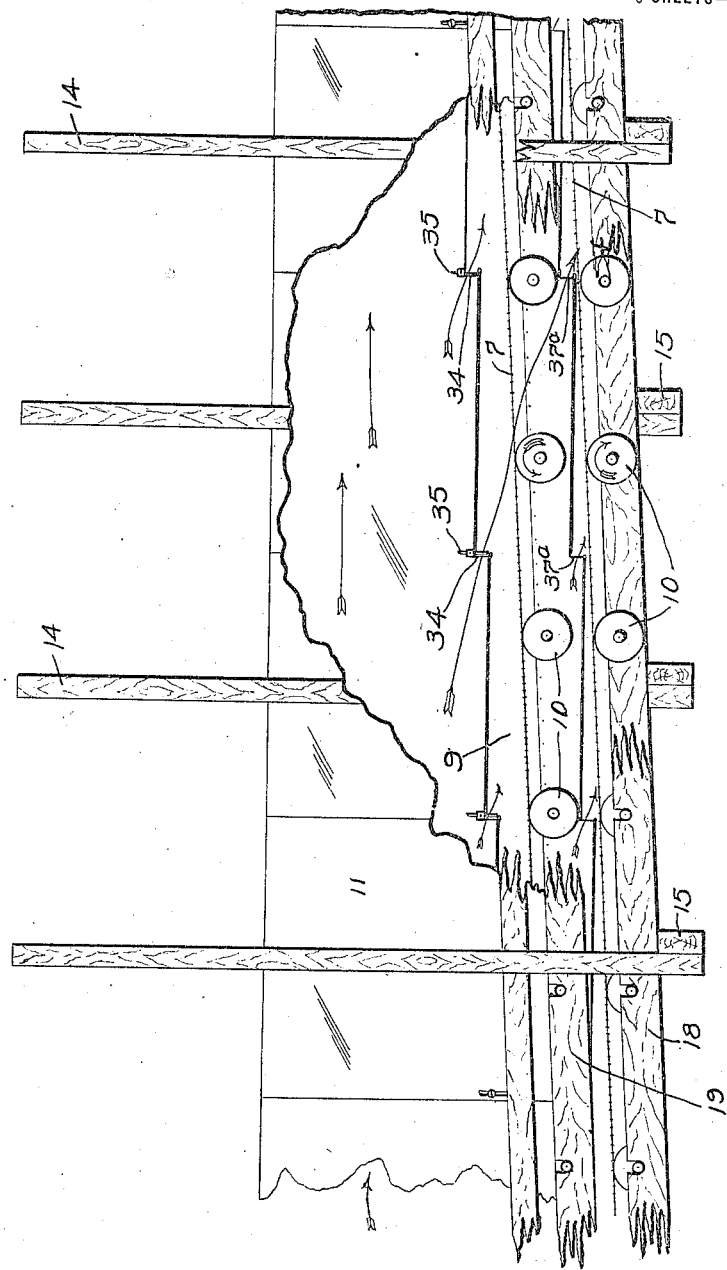
Figure 6:
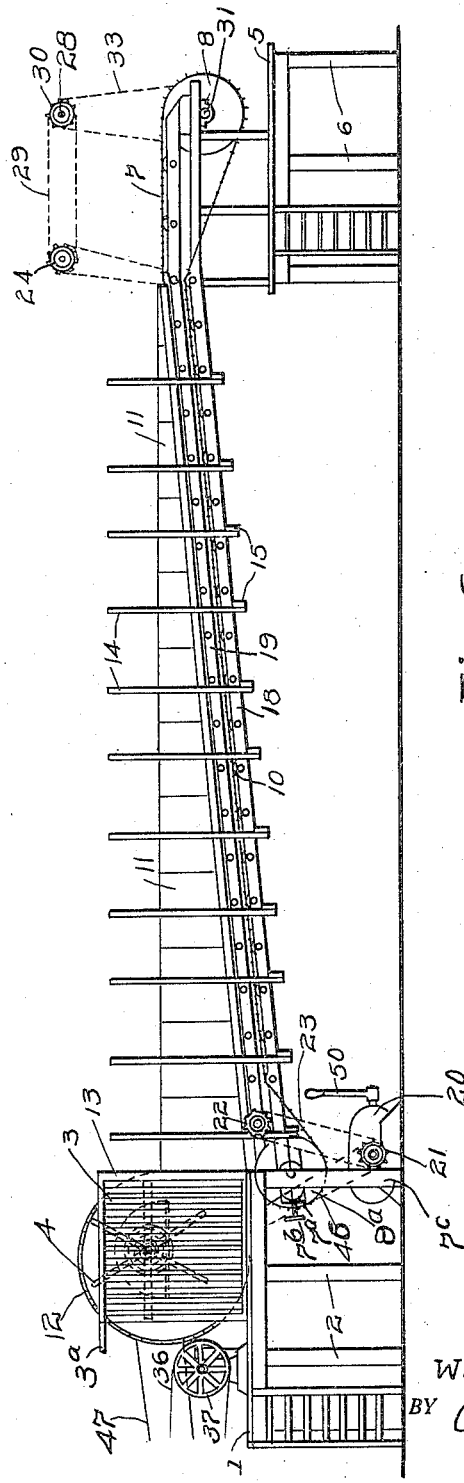

With these and other objects in view as will appear hereinafter, my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a top or plan view of the front platform portion of the apparatus, the conveyer and air ducts being partly broken away to facilitate the illustration, Fig. 2 is a front elevational view thereof, Fig. 3 is a top or plan view of the rear platform portion, the conveyer and ducts being partially broken away to facilitate the illustration, Fig. 4 is an enlarged fragmentary plan view of the middle portion of said apparatus showing portions broken away to facilitate the illustration, Fig. 5 is a side elevational view of a similar fragmentary portion and showing portions broken away to facilitate the illustration, and Fig. 6 is a side elevational view of the apparatus complete on a reduced scale from that of the other views of the drawings.

Similar characters of reference refer to similar parts and portions throughout the several views of the drawings.

The front platform 1 is preferably a rectangularly shaped platform as shown best in Fig. 1 of the drawings and it is elevated to a suitable position by means of the supporting posts 2. It is provided with a stairs 1ª to afford easy access to said platform. Mounted on the top of this platform 1 is a radiator 3 which is a conventional radiator for heating air passing therethrough and it is mounted in a housing 13 which incloses said radiator and mounted adjacent this radiator on said platform is a fan 4 which communicates with the inside of the housing 13 and this fan is revolubly mounted in the fan housing 12 and is for the purpose of conducting the air from the radiator 3 into the warm air duct 11 and forcing it toward the opposite end of said warm air duct.

It will be here noted that this warm air duct 11 is inclosed on the top and sides and gradually tapers toward the opposite end thus reducing its area toward said opposite end so that the warm air is forced out through apertures 34 into the conveyer duct 9 and out through the apertures 37ª. The area of the duct decreasing thus provides equal circulation the full length of the said duct. The lower side of this duct 11 is provided with transverse apertures 34 as hereinbefore described which permit a certain quantity of the air from said duct to pass out onto the articles to be dried on the conveyer 7. It will be noted that the conveyer 7 moves in the opposite direction from the movement of the air as shown by the arrows in Fig. 5 of the drawings. This, however, is only the preferable construction as in some cases it is desirable to operate the conveyer in the same direction as the air. The transverse apertures 34 are provided with dampers which may be raised and lowered for regulating the width of these apertures, thereby regulating the quantities of air passing out of the lower side of the duct. Mounted just below the upper series of rollers 10 and above the backwardly moving portion of the conveyer is a bottom for the warm air duct 9, which is provided with a plurality of transverse apertures $37^a$ which permit the exit of the moisture laden air to the outside.

The conveyer 7 is operated by means of drums 8 and $8^a$ at opposite ends and by means of the rollers 10 which are provided with sprockets 16 upon which the chain 17 is mounted and this chain 17 is operated by means of a sprocket 22. This chain 17 also operates the drum 8 which is considerably larger in diameter, through the sprockets 16, 24 and 26, chain 29, sprockets 30 and 32 and chain 33. The sprocket 22 is operated through the chain 23 and sprocket 21 through transmission 20 which is operated by chain 40 extending to the sprocket 44. The sprocket 44 is mounted on a shaft 43 which is provided with a worm pinion $42^a$, which engages a worm gear 42. Secured to the shaft 41 and on the opposite end of said shaft is mounted a bevel gear 40 which engages a bevel gear 39 on the shaft 38 and mounted on this shaft 38 is a sheave 37 which is operated by any driving mechanism through the belt 36. The fan 4 is secured on a shaft 51 which extends outwardly through the casing 12 and on this shaft is rigidly secured a sheave 48 which is operated by any driving mechanism through the belt 47. The one end of this conveyer is mounted on a platform 5 which is preferably a rectangular platform as shown best in Fig. 3 of the drawings and the articles to be dried are placed on the conveyer at this end and are removed from the conveyer at the opposite end. The conveyer rolls are supported by means of beams 18 and 19 which also form journals for said rolls. The central portion of these beams 18 and 19 are supported by means of transverse beams 15 which may be secured to the wall on one side and the vertical supports 13 may be secured to the ceiling thus providing a rigid support for the conveyer and warm air duct. This conveyer is provided with adjusting members $7^a$ which form the journal for the roll 9 and these bars are provided with screws $7^b$ which rest against the post $7^c$ thus providing for adjustment of the conveyer and for keeping it taut. It will be noted that I have shown and described chain, sprocket and gear means for operating the conveyer and change speed means for changing the speed of said conveyer but it is obvious that different means may be used for operating said conveyer and a different conveyer may be used without departing from the drying means as herein described.

The operation of my apparatus is as follows:

The radiator 3 is heated by means of the pipes $3^a$ and the fan 4 is revolved and draws a current of air through the radiator 3 and drives it into the warm air duct 11. The pulley 37 is operated by a power mechanism which in turn revolves the sprocket 44 which revolves the sprocket 45 and the mechanism is thrown into gear by means of the lever 50 which controls the shifting gears in the transmission 20 and the conveyer is actuated thereby through sprockets and chains as hereinbefore described. The articles to be dried are placed upon the conveyer 7 from the platform 5 and are carried by said conveyer through the conveyer duct 9 to the opposite end. As the articles to be dried pass through the duct 9 they are met at intervals with a fresh current of warm air from the duct 11 through the aperture 34 which passes out through the aperture $37^a$ so that by the time the articles to be dried have passed from one end to the other the fresh currents of warm air have absorbed all the moisture. In order to distribute the volume of warm air properly the air duct 11 is tapered so that the area is reduced as the air passes outwardly from the fan and the small end is closed so that all the air that escapes must pass through the apertures 34 and into the conveyer duct 9 and over the article to be dried before it can escape to the outside.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent is:

1. In a drying apparatus, the combination of a warm air duct, a conveyer duct in close proximity thereto, a conveyer movable therein, means for permitting the exit at intervals of regulated quantities of warm air from said warm air duct to said conveyer duct, means for forcing warm air into said warm air duct, and a plurality of air exit apertures below said conveyer whereby the warm air passes from the said warm air duct into said conveyer duct and out through the warm air exits past and through said conveyer.

2. In a drying device of the class described, a horizontally disposed housing having an upper longitudinal chamber and a lower longitudinal chamber therein, the upper chamber being adapted to receive warm air and being provided with a series of apertures in the bottom thereof opening into the lower chamber whereby said warm air is admitted into said lower chamber, said lower chamber being provided with a corresponding number of apertures in the bottom thereof, in combination with a foraminous conveyer operatively mounted in said lower chamber; for the purpose of drying fish, fruit, and so forth.

3. In a drying apparatus of the class described, a horizontally disposed housing having two longitudinal chambers therein, one above the other, the upper chamber being adapted to receive warm air and being provided with apertures leading into the lower chamber whereby said warm air is admitted to said lower chamber, said apertures being provided with dampers whereby said warm air may be shut off at any desired aperture; said lower chamber being provided with a series of apertures in the bottom thereof for the escape of said air; in combination with a conveyer operatively mounted in said lower chamber; for the purposes set forth.

4. A drier of the class described, comprising a horizontally disposed housing having a tapering chamber therein adapted to receive warm air and provided with a series of apertures in the bottom thereof, said rectangular chamber disposed below said tapering chamber and provided with a series of apertures in the bottom thereof, said first named apertures being adapted to discharge air into said rectangular chamber and said last named apertures being adapted to discharge air into the open; in combination with a foraminous conveyer operatively mounted in said rectangular chamber; for the purposes of drying fish, fruit, vegetables and so forth.

In testimony whereof, I have hereunto set my hand at San Diego, California, this 13th day of December, 1918.

WILLIAM H. PERRY.